United States Patent
Narushima

(10) Patent No.: US 8,365,002 B2
(45) Date of Patent: Jan. 29, 2013

(54) ELECTRONIC APPLIANCE, METHOD OF SETTING RETURN INTERFACE, RETURN COMMUNICATION METHOD AND COMPUTER PROGRAM

(75) Inventor: Toshio Narushima, Kanagawa (JP)

(73) Assignee: Sony Corporation, Tokyo (JP)

( * ) Notice: Subject to any disclaimer, the term of this patent is extended or adjusted under 35 U.S.C. 154(b) by 834 days.

(21) Appl. No.: 12/033,575

(22) Filed: Feb. 19, 2008

(65) Prior Publication Data

US 2008/0201594 A1    Aug. 21, 2008

(30) Foreign Application Priority Data

Feb. 21, 2007   (JP) ................. 2007-040254

(51) Int. Cl.
   *G06F 1/00*    (2006.01)
   *G06F 1/26*    (2006.01)
   *G06F 1/32*    (2006.01)
   *G06F 11/30*   (2006.01)

(52) U.S. Cl. .................... 713/340; 713/300; 713/320

(58) Field of Classification Search .................. 713/300, 713/320, 323, 324
   See application file for complete search history.

(56) References Cited

U.S. PATENT DOCUMENTS

| | | | | |
|---|---|---|---|---|
| 6,092,208 A | * | 7/2000 | Reneris | 713/323 |
| 7,117,377 B2 | * | 10/2006 | Hagiwara et al. | 713/300 |
| 2004/0003307 A1 | * | 1/2004 | Tsuji | 713/310 |
| 2005/0198257 A1 | * | 9/2005 | Gupta et al. | 709/224 |
| 2006/0128350 A1 | * | 6/2006 | Hurwitz et al. | 455/343.2 |
| 2006/0206734 A1 | * | 9/2006 | Hori | 713/300 |

FOREIGN PATENT DOCUMENTS

| | | |
|---|---|---|
| JP | 2003-280770 | 10/2003 |
| JP | 2005-169263 | 6/2005 |
| JP | 2005-196741 | 7/2005 |
| JP | 2005-275771 | 10/2005 |
| JP | 2007-034640 | 2/2007 |

OTHER PUBLICATIONS

Japanese Patent Office Action corresponding to Japanese Serial No. 2007-040254 dated Apr. 27, 2010.
A Japanese Office Action dated Dec. 9, 2008 issued in connection with counterpart Japanese Patent Application No. 2007-040254.
Japanese Office Action issued on Jul. 28, 2009 in connection with JP Application No. 2007-040254.

* cited by examiner

*Primary Examiner* — Paul Yanchus, III
*Assistant Examiner* — Brandon Kinsey
(74) *Attorney, Agent, or Firm* — SNR Denton US LLP

(57) ABSTRACT

An electronic appliance designed for low power consumption mode having a plurality of hardware interfaces mounted thereon for communication with an external device is disclosed. The electronic appliance includes a return interface setting part configured to variably set a part of the plurality of the hardware interfaces as a return interface that waits for receiving a return signal.

19 Claims, 13 Drawing Sheets

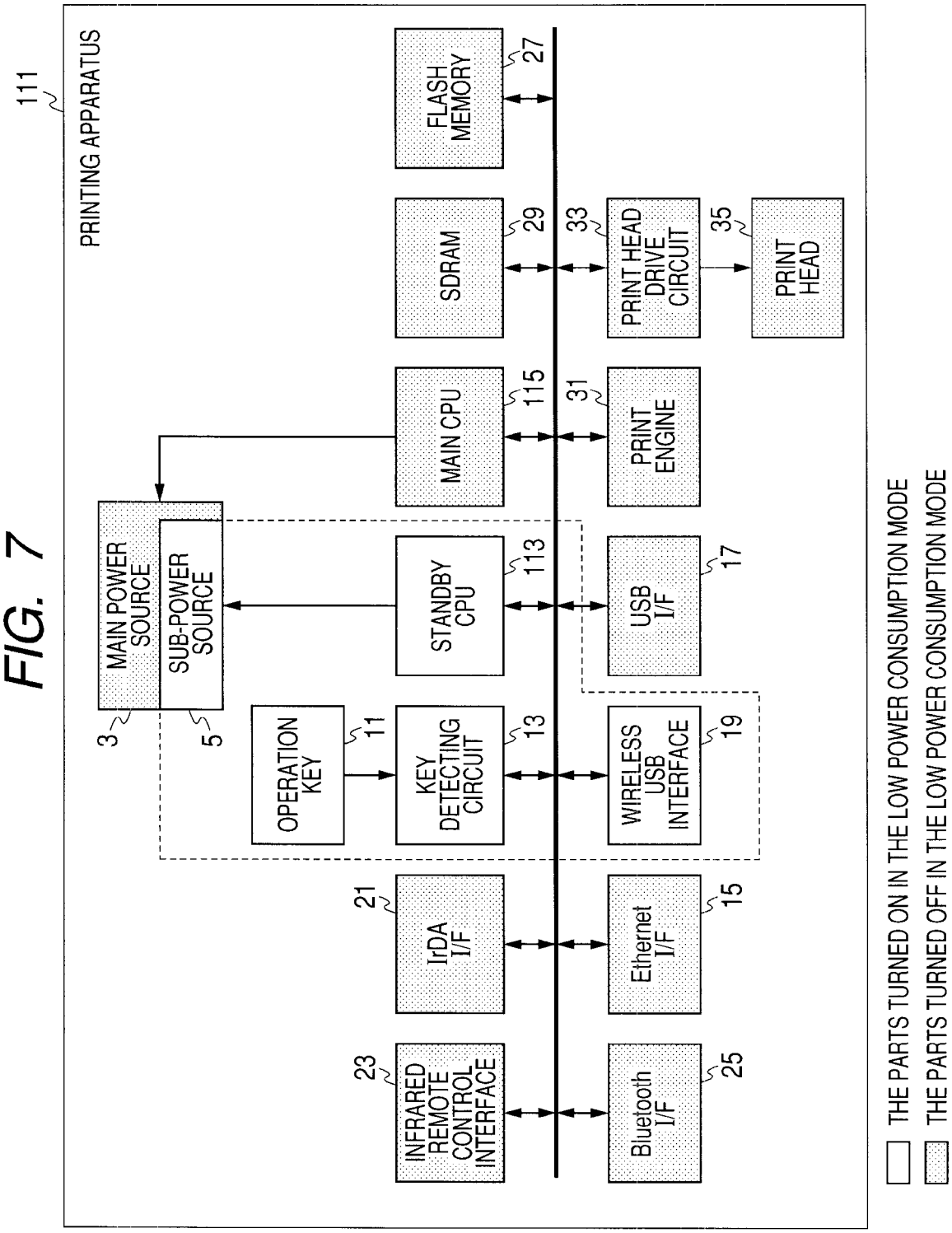

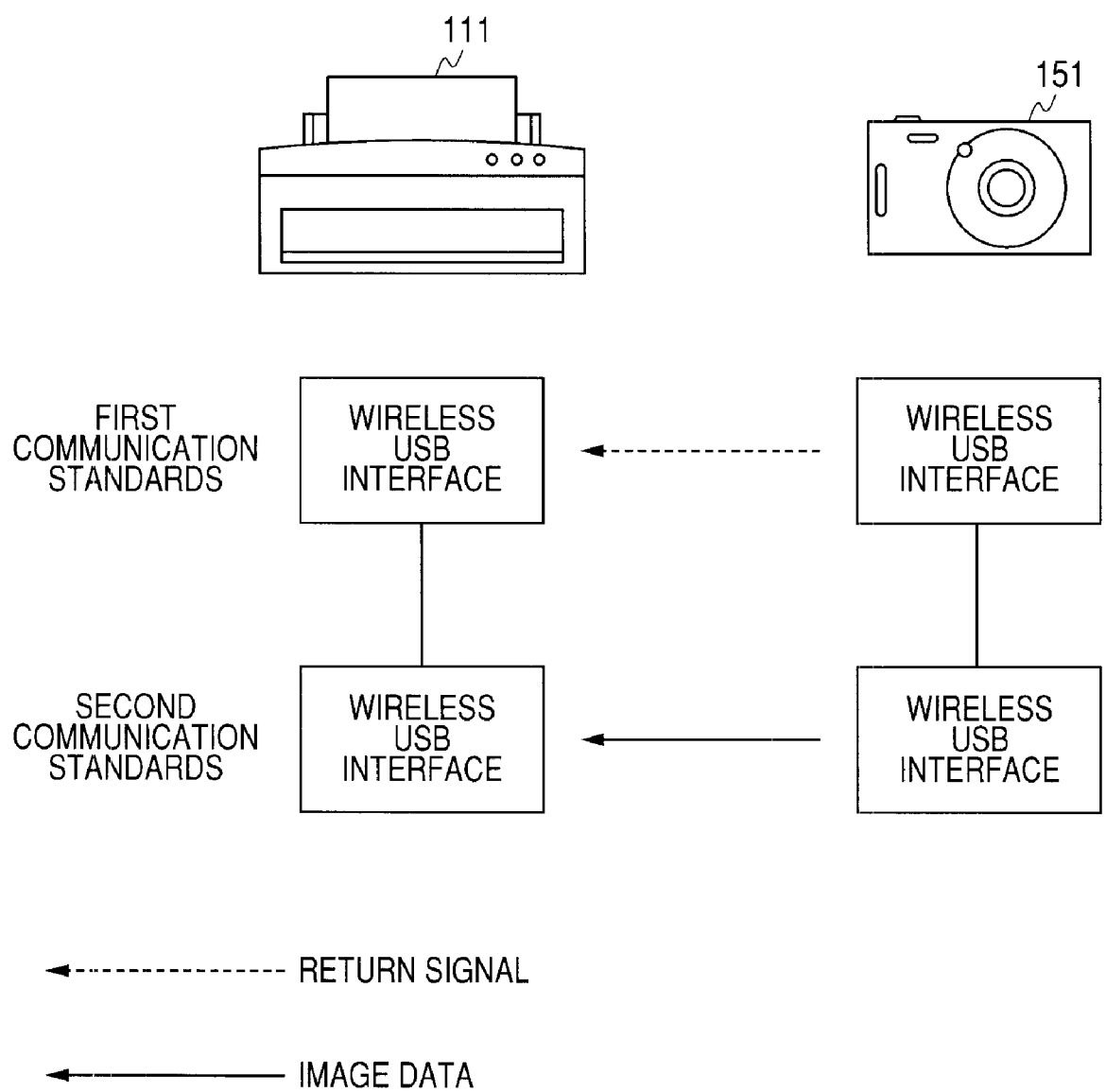

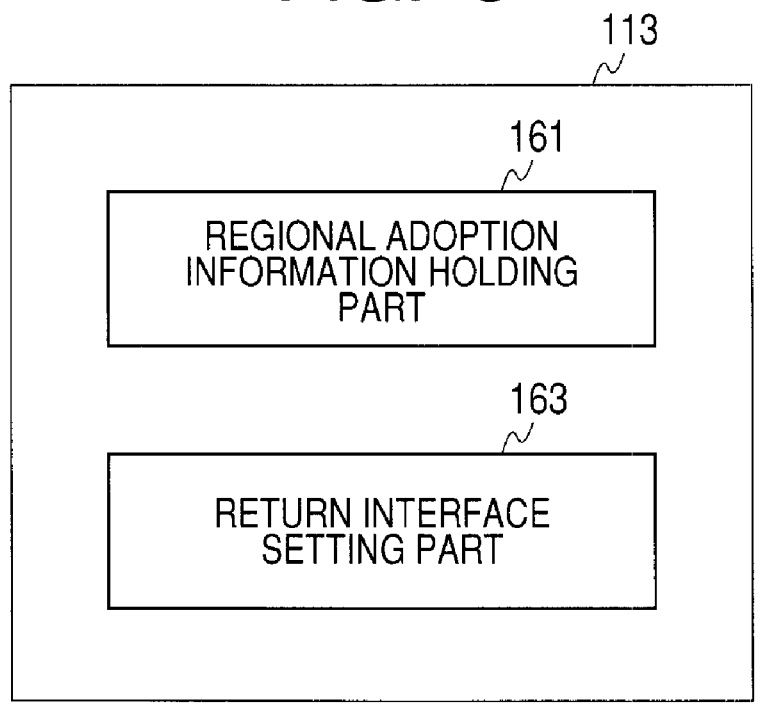
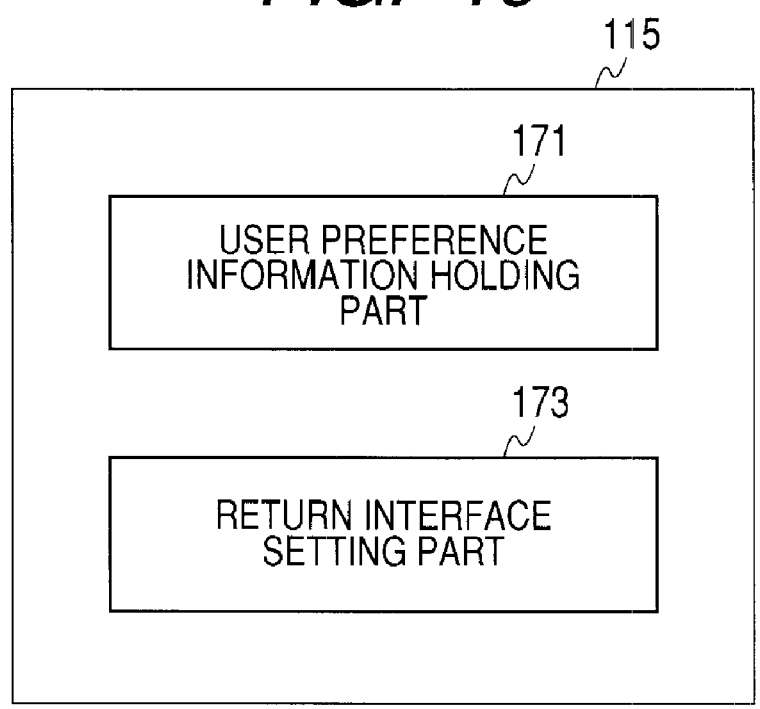

ELECTRONIC APPLIANCE, METHOD OF SETTING RETURN INTERFACE, RETURN COMMUNICATION METHOD AND COMPUTER PROGRAM

CROSS REFERENCES TO RELATED APPLICATIONS

The present invention contains subject matter related to Japanese Patent Application JP 2007-040254 filed in the Japanese Patent Office on Feb. 21, 2007, the entire contents of which being incorporated herein by reference.

BACKGROUND OF THE INVENTION

1. Field of the Invention

The present invention relates to techniques of realizing low power consumption and returning the power supply level of an electronic appliance that has a plurality of hardware interfaces mounted thereon for communicating with another electronic appliance. Moreover, the electronic appliance is not restricted to a particular filed, for which any types of appliances are targeted.

The proposed invention includes an electronic appliance, a method of setting a return interface, a return communication method and a computer program.

2. Description of the Related Art

In recent years, increasing concerns are energy issues and environment issues. With these concerns as a backdrop, it is demanded to further reduce the power consumption of electronic appliances used in daily life. On this account, many electronic appliances have a low power consumption operation mode in which a nonuse state after a power source is turned on is detected to automatically stop power supply to unnecessary circuits.

For example, in an image forming apparatus such as a printing apparatus and a FAX machine, the state in which no input signals are detected is continued for a certain time period or longer, and then the operation mode is automatically shifted to the low power consumption mode. In the low power consumption mode, the image forming apparatus is controlled to turn off power supply to unnecessary circuits except circuits used for communication with external devices. In addition, in the case in which a return signal or image data is received from an external device, power supply is restarted to individual circuits. Thus, the image forming apparatus is ready to form images.

However, with the advance of digital imaging technology, electronic appliances are demanded to cope with various communication forms and communication standards. On this account, electronic appliances nowadays have a plurality of hardware interfaces mounted therein for communication with external devices.

The return from the low power consumption mode to the normal operation mode is sometimes given from an external device as a return signal.

Thus, even during the low power consumption mode, many electronic appliances adopt a scheme to continue power supply to a hardware interface used for communication with external devices. FIG. 1 shows a form of power supply in the low power consumption mode.

In addition, FIG. 1 shows the case in which an electronic appliance is a printing apparatus. In the case of the printing apparatus 1 shown in FIG. 1, circuit blocks that are turned on in the low power consumption mode are depicted white. Moreover, circuit blocks that are turned off in the low power consumption mode are shaded.

However, electric power is supplied to a large number of hardware interfaces, which causes a problem that it is difficult to enjoy the advantage of the low power consumption mode at the maximum. In other words, there is a problem that goes against the trend of low power consumption to set back an efficient reduction in power consumption.

Furthermore, JP-A-2005-196741 (Patent Reference 1; Paragraph Number 0018) proposes a scheme in which power supply during the low power consumption mode is restricted to the circuits of a reception system for a hardware interface used for communication with an external devices. In other words, a scheme is proposed in which a transmitting function is controlled to turn off during the low power consumption mode. With this scheme, it is intended to more reduce power consumption than techniques before.

SUMMARY OF THE INVENTION

However, even though the hardware interface corresponding to the transmitting function controlled to turn off, reception functions are controlled to turn on by the number of mounted hardware interfaces. On this account, since electronic appliances nowadays have a large number of hardware interfaces mounted thereon, the effect of reduction in power consumption is not enough.

Thus, it is conceivable to mount a return interface setting part that variably sets a part of a plurality of hardware interfaces as a return interface that waits for receiving a return signal on an electronic appliance designed for low power consumption mode having a plurality of the hardware interfaces mounted thereon for communication with external devices.

Of course, in the viewpoint of reducing power consumption, it is better to set a fewer number of hardware interfaces as return interfaces. Therefore, desirably, a single hardware interface works as a return interface. However, if allowed, desirably, a plurality of hardware interfaces works as a return interface.

With the adoption of a technique according to an embodiment of the invention, a part of return interfaces to which power is supplied during the low power consumption mode can be set as a hardware interface. Thus, the effect of reduction in power consumption can be improved.

In addition, in the case of the technique according to an embodiment of the invention, the return interface can be set variably as the use mode of the electronic appliance and the characteristics of the hardware interface are reflected. Therefore, the effect of reduction in power consumption and user's usability can be improved.

BRIEF DESCRIPTION OF THE DRAWINGS

FIG. 7 shows a diagram depicting a power supply area in the low power consumption mode (an example according to an embodiment);

FIG. 8 shows a diagram depicting exemplary transmission paths of the return signal;

FIG. 9 shows a diagram depicting an exemplary functional block that implements the return interface setting processing function;

FIG. 10 shows a diagram depicting an exemplary functional block that implements the return interface setting processing function;

DETAILED DESCRIPTION OF THE INVENTION

Hereinafter, an electronic appliance according to an embodiment of the invention will be described.

In addition, to the sections neither depicted nor described particularly in the specification, well known or publicly known techniques in the relevant technical field are adapted.

Moreover, embodiments described below are one of embodiments according to an embodiment of the invention, which will not restrict the invention.

Printing Apparatus

An Exemplary Configuration of a Printing Apparatus

Figure 1:
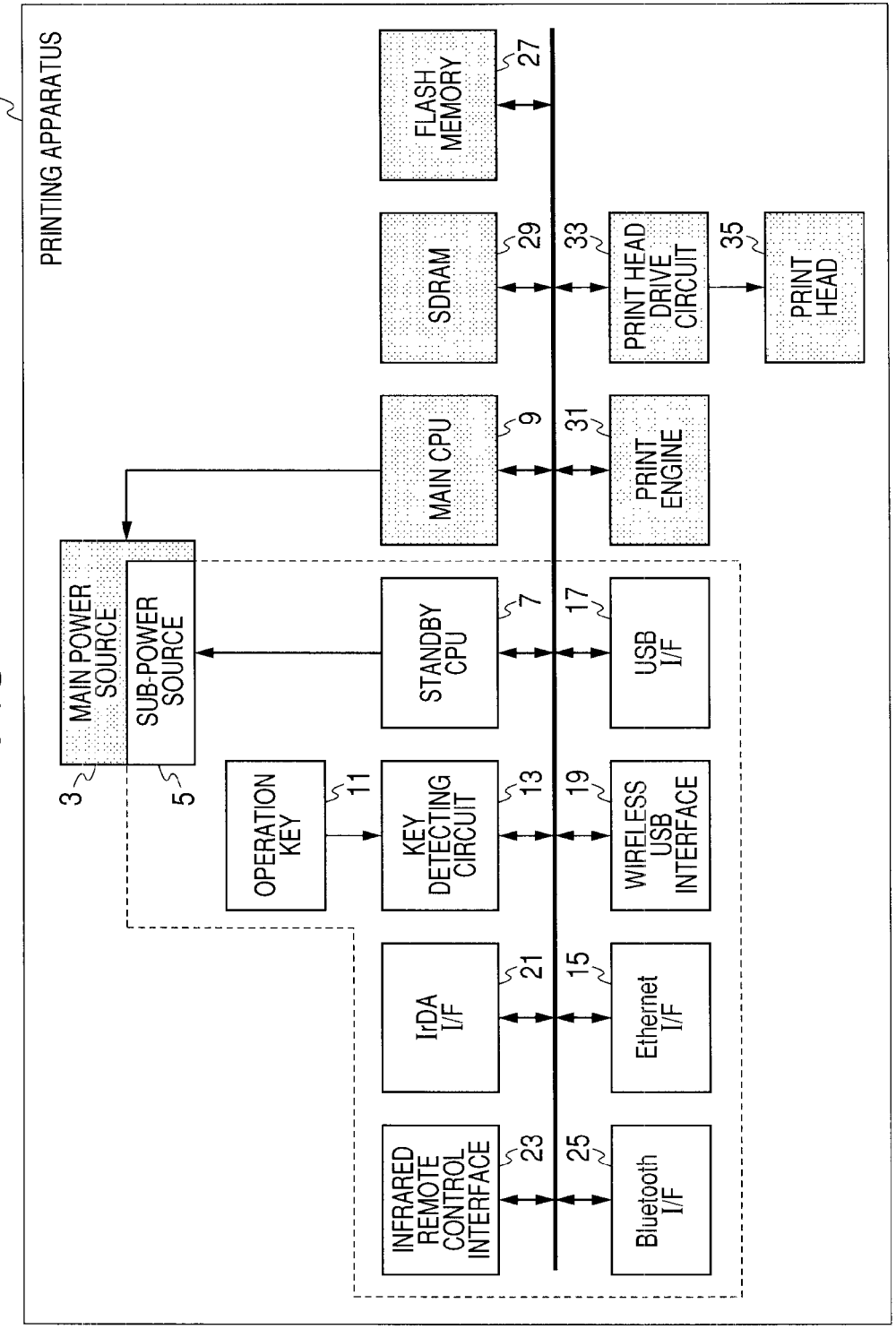
FIG. 1 shows a diagram depicting a power supply area in the low power consumption mode (an example before)
Figure 2:
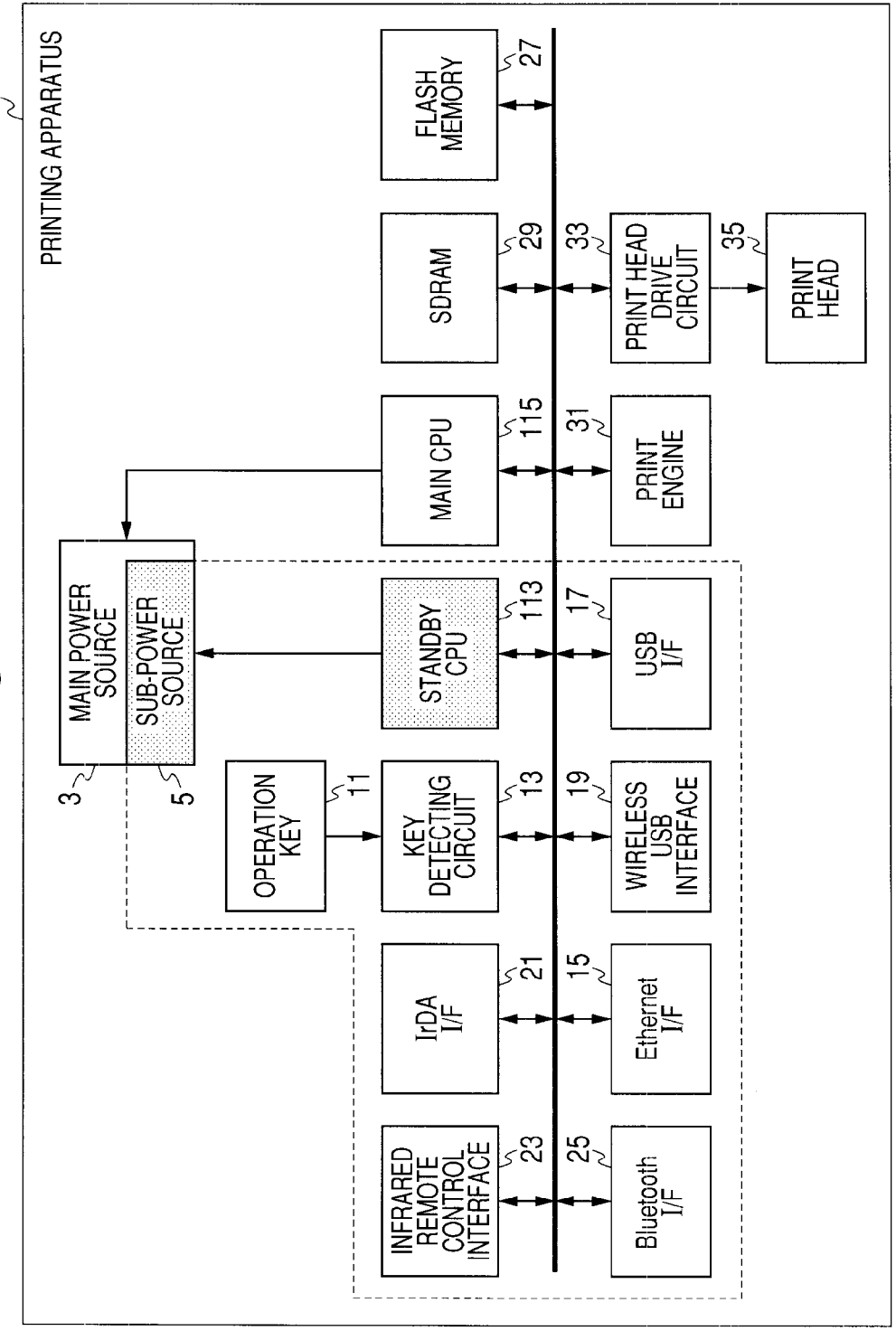
FIG. 2 shows a diagram depicting a power supply area in the normal operation mode.

FIG. 2 shows an exemplary circuit configuration of a printing apparatus 111 having functions according to an embodiment of the invention mounted thereon. In addition, in order to clearly show the difference from an example before, the same parts are designated the same numerals and signs in FIG. 2.

The power source of the printing apparatus 111 has a main power source 3 and a sub-power source 5. In other words, a two converter system is adopted. Thus, the operation modes can be switched between a normal operation mode (normal state) and a low power consumption mode (standby state).

The main power source 3 is a power source that supplies electric power to the individual blocks of the printing apparatus 111. In the case in which the operation state is shifted from the normal state to the standby state, the main power source 3 stops power supply to the individual blocks. In addition, in FIG. 2, circuit blocks to which electric power is supplied during the normal operation mode are depicted white.

The sub-power source 5 is a power source that supplies electric power only to a particular circuit block in the low power consumption mode. In other words, in the case in which the operation state is shifted from the normal state to the standby state, the sub-power source 5 supplies electric power only to a standby CPU 113 and a return interface. Moreover, the setting of the return interface will be described later. In FIG. 2, circuit blocks that are controlled to turnoff during the normal operation mode are shaded.

Moreover, in FIG. 2, it is depicted that the sub-power source 5 stops power supply to the standby CPU 113 during the normal operation mode, but the sub-power source 5 may continue to supply power to the standby CPU 113 during the normal mode.

The printing apparatus 111 has the standby CPU 113 and a main CPU 115 for normal state mounted thereon as control circuits. Both CPUs have a RAM and a ROM.

Preferably, the standby CPU 113 is configured of a one-chip CPU having a RAM and a ROM incorporated therein.

The standby CPU 113 is used to start the main power source 3 when a return instruction is detected during the standby state. The main power source 3 is started to activate the main CPU 115, and then the individual circuits in the apparatus are returned to the normal state.

The main CPU 115 is a processing system that controls operations in the normal state and implements a return interface setting function proposed in this embodiment. In some cases, the standby CPU 113 may implement the return interface setting function proposed in the embodiment.

An operation key 11 is configured of manipulating parts provided on the front surface of the cabinet of the printing apparatus. Manipulations to the operation key 11 (for example, on manipulation or off manipulation) are detected by a key detecting circuit 13. Because of the provision of the operation key 11, direct input manipulations can be performed with no dependence of a host device, for example.

Of course, even during the low power consumption mode, input manipulations can be performed through the standby CPU 113. Moreover, instead of the operation key 11 and the key detecting circuit 13, a touch panel and a touch panel control circuit may be mounted.

As hardware interfaces used for communication with the external devices, the printing apparatus 111 has an Ethernet (registered trademark) interface 15, a USB interface 17, a wireless USB interface 19, an IrDA interface 21, an infrared remote control interface 23 and a Bluetooth interface 25 mounted thereon.

The Ethernet (registered trademark) interface 15 is a hardware interface that can send and receive various items of data at a transfer rate of 10 Mbps or 100 Mbps with external devices connected to a network.

The USB interface 17 and the wireless USB interface 19 are hardware interfaces that can send and receive various items of data at a transfer rate of 480 Mbps at the maximum with external devices connected through a USB cable and a wireless transmission line.

The IrDA interface 21 is a hardware interface that can send and receive data at a transfer rate of 4 Mbps at the maximum via optical wireless communications with external devices connected through infrared rays (in the case in which the distance between devices is within one meter).

The infrared remote control interface 23 is a hardware interface that sends a control command in one way at a transfer rate of 1 Kbps at the maximum via optical wireless communications with external devices connected through infrared rays (in the case in which the distance between devices is 10 m or longer).

The Bluetooth interface 25 is a hardware interface that can send and receive various items of data at a transfer rate of 3 Mbps at the maximum with external devices connected using radio waves of a 2.45 GHz band (in the case in which the distance between devices is within 10 m).

Moreover, the transfer rates described above are the values when this patent application was filed. Therefore, depending on the development of technologies, the transfer rates of these hardware interfaces may be different values.

In addition, the hardware interfaces exemplified in FIG. 2 are only examples, and other hardware interfaces may be mounted.

For example, a card reader unit (not shown) that reads and writes data on an external recording medium such as a flash memory may be mounted as a hardware interface. In this case, the standby CPU 113 detects the insertion of the external recording medium into the card reader unit, and starts the main power source 3.

In addition, for example, a drive unit (not shown) that reproduces data on an external recording medium such as a CD-ROM may be mounted as a hardware interface. In this case, the standby CPU 113 detects the insertion of the external recording medium into the drive unit, and starts the main power source 3.

In addition to these units, the printing apparatus 111 has circuits and devices specific to a printing system mounted thereon.

The flash memory 27 is a non-volatile semiconductor memory that is used to store firmware.

An SDRAM 29 is a semiconductor memory that configures a spooler.

The SDRAM 29 is used to temporarily hold a plurality of items of image data received or inputted from external units through various hardware interfaces described above. Moreover, items of image data after image processed are in turn sent as print data from the SDRAM 29 to a print head 35 through a print head drive circuit 33.

In addition, image data in the spooler is held in the configuration of a cyclic buffer in which the newest image data is overwritten and recorded in the area in which the oldest image data has been inputted or received. In the case of the embodiment, after the image data is recorded on a printing paper, the image data is held in the spooler until a certain time period passes or until image data subsequently inputted is overwritten and recorded.

Image data in the spooler can be held in a FIFO (First In First Out) configuration. In this case, when the data amount exceeds a set amount in recording the newest image data, the oldest record image data is deleted and then the newest image data is held.

Since the spooler function is mounted, a user can omit the effort of again inputting image data when the same image is reprinted.

A print engine 31 is a print mechanism that cooperates with the print head 35 based on control data given from the main CPU 115. In other words, the print engine 31 performs the process of recording an image on a printing paper through carrying the printing paper.

The Shift to the Low Power Consumption Mode and the Return from the Low Power Consumption Mode Here, the basic process operations performed by the printing apparatus 111 will be described.

In the case in which the nonprint state is continued for certain time period, or a user instructs that the operation mode is shifted to the low power consumption mode, the main CPU 115 of the printing apparatus 111 starts a process of shifting the normal operation mode to the low power consumption mode.

In other words, the main CPU 115 controls the main power source 3 to stop power supply to the main CPU 115, the SDRAM 29, the print engine 31, the print head 35, and the other blocks. At the same time, the main CPU 115 controls the sub-power source 5 to start power supply to the standby CPU 113, the operation key 11, the key detecting circuit 13 and a return interface.

At the point in time at which it is finished to switch the power sources, the printing apparatus 111 is completely shifted to the low power consumption mode. Of course, electric power is supplied to the controller and the physical layer of the hardware interface that is set as a return interface. Therefore, even during the low power consumption mode, only the return interface can receive data sent from an external unit. One of these items of data is a return signal.

The return interface receives a return signal, and then instead of the main CPU 115, the standby CPU 113 performs the protocol process matched with the return interface. After the reception of the return signal is confirmed, the standby CPU 113 starts the main power source 3. In other words, the main power source 3 restarts power supply. A time period necessary to return to the normal state is about 0.5 seconds to 2 seconds.

Moreover, the return from the low power consumption mode to the normal state is performed also in the case in which image data is inputted through the card reader unit or the drive unit in addition to the case in which an instruction input is made to the external unit or the operation key 11. In this case, the input of the image data serves as the return signal.

In any cases, the printing apparatus 111 maintains the low power consumption mode as long as no reception or the input of the return signal is made.

The Process of Setting the Return Interface

Hereinafter, schemes of setting the return interface proposed by an inventor will be described.

Exemplary Setting 1

Figure 3:
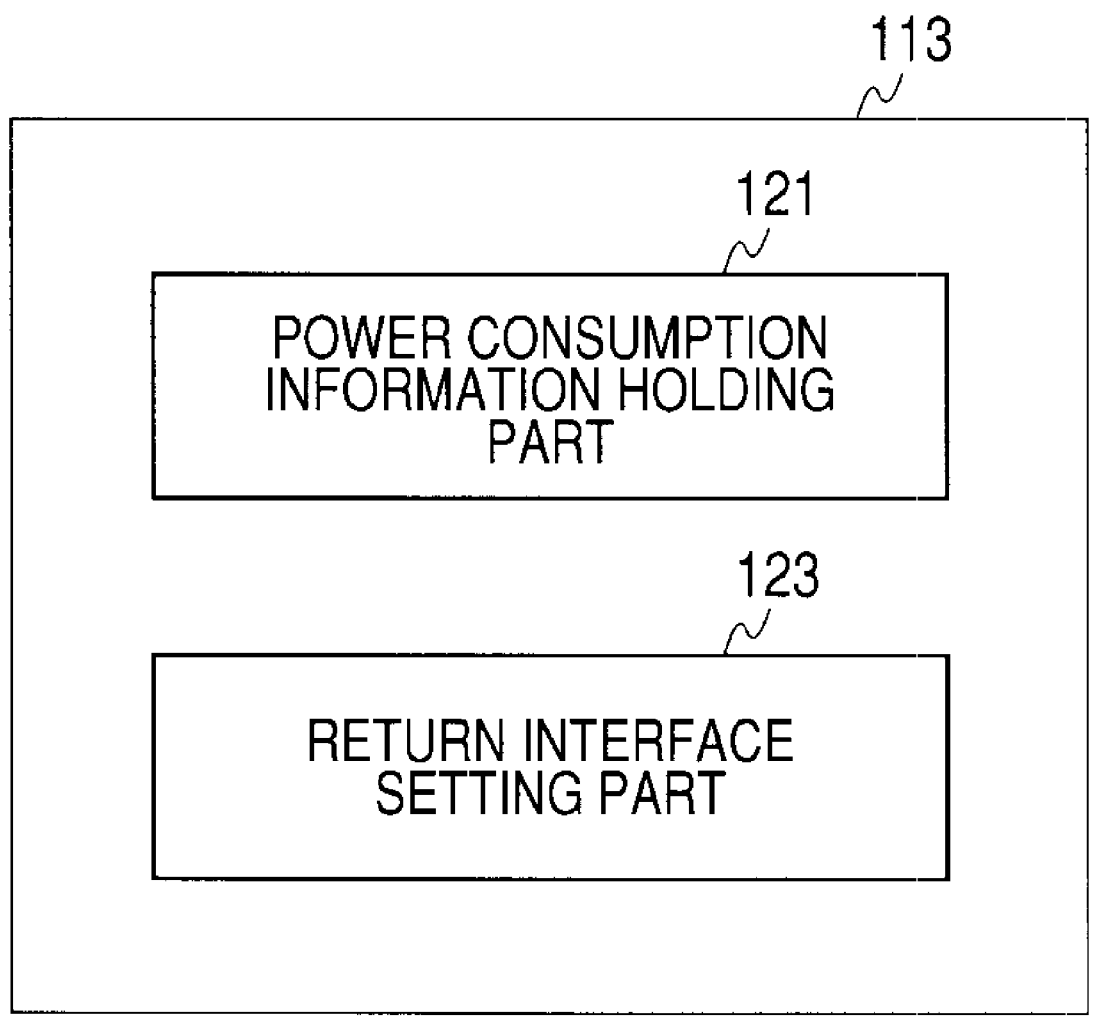
FIG. 3 shows a diagram depicting an exemplary functional block that implements a return interface setting processing function.

FIG. 3 shows a functional circuit configuration that implements the process of setting the return interface. FIG. 3 depicts that the standby CPU 113 performs the process corresponding to the same function.

As shown in FIG. 3, the standby CPU 113 functions as a power consumption information holding part 121 and a return interface setting part 123.

The power consumption information holding part 121 is a storage device that stores information about the power consumption of hardware interfaces mounted on the printing apparatus 111. For example, the power consumption information holding part 121 uses a part of the area of the ROM configuring the standby CPU 113. An external memory may be used when the standby CPU 113 can make access thereto even in the low power consumption mode.

The return interface setting part 123 compares items of power consumption information, and sets a hardware interface having the smallest power consumption to a return interface. Thus, electric power is supplied only to the relevant hardware interface.

In the case in which the power consumption information holding part 121 stores therein only information that identifies the hardware interface having the smallest power consumption, the return interface setting part 123 performs the process of setting the return interface based on the stored information.

Figure 4:
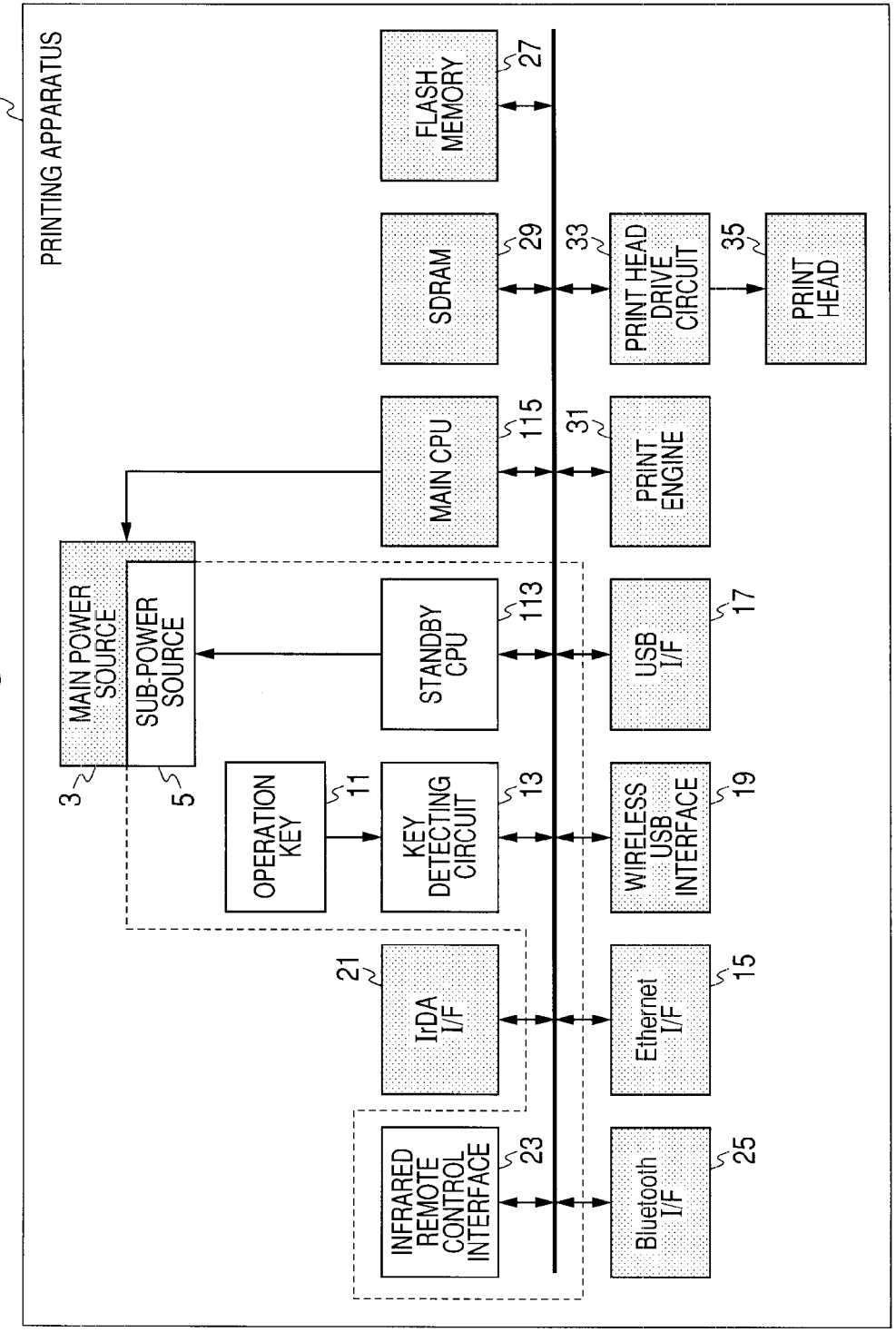
FIG. 4 shows a diagram depicting a power supply area in the low power consumption mode (an example according to an embodiment)

FIG. 4 shows the on and off states of the individual circuit blocks in the low power consumption mode. In the case of FIG. 4, among six hardware interfaces prepared for communication with external devices, electric power is supplied only to the infrared remote control interface 23.

This is because the power consumption of the infrared remote control interface 23 is smaller than that of the other five hardware interfaces. Therefore, the power consumption during the low power consumption mode can be made smaller than any cases of operating the other hardware interfaces.

In addition, since the number of the hardware interfaces is one interface that operates as a return interface during the low power consumption mode, the processing performance of the standby CPU 113 is smaller than the processing performance of processing all the hardware interfaces. Of course, in the viewpoint of the power consumption, the smaller the processing performance is, the lower the power consumption is. The power saving effect is in common with the other examples described later.

Figure 5:
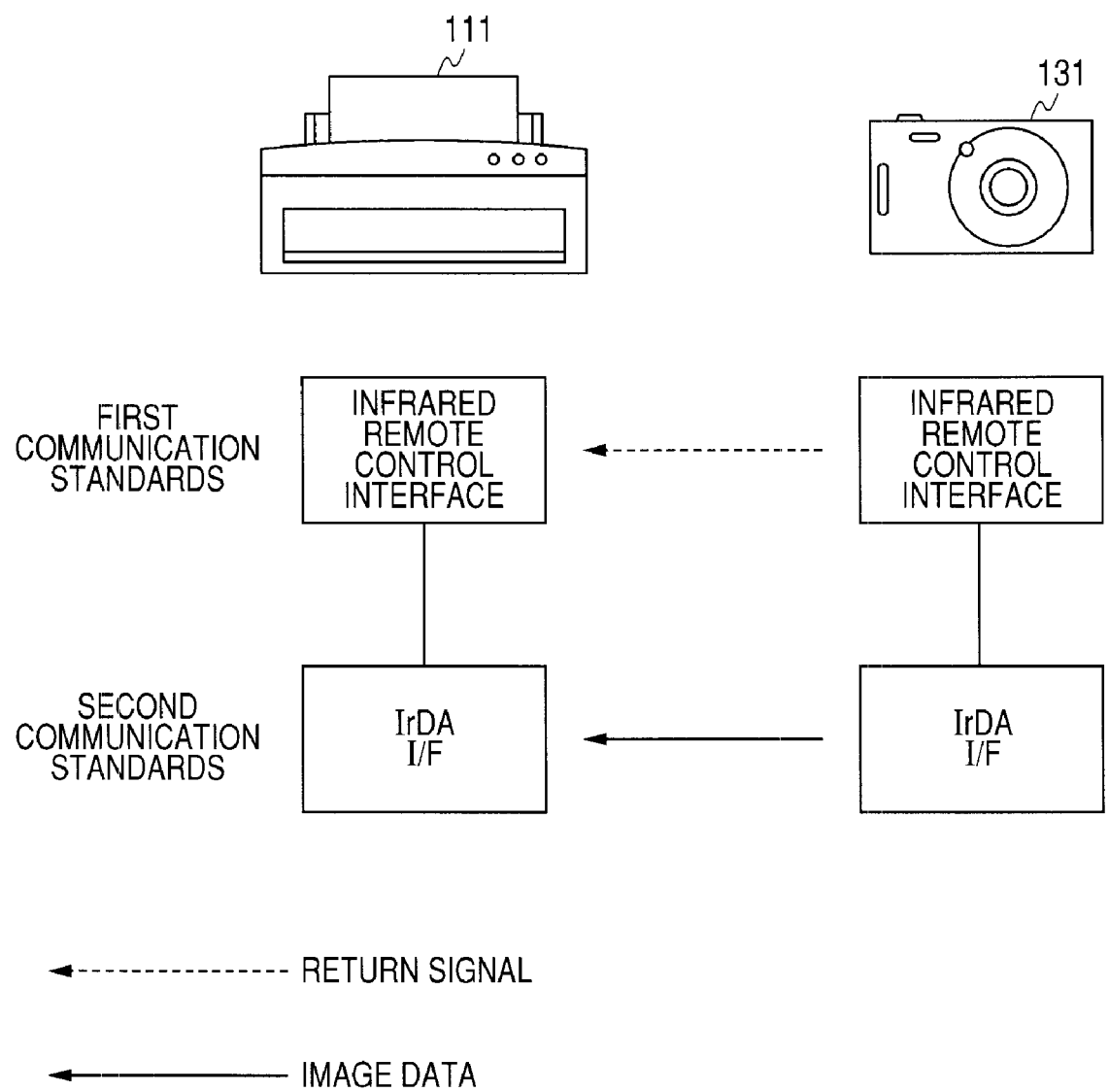
FIG. 5 shows a diagram depicting exemplary transmission paths of a return signal.

FIG. 5 shows an exemplary operation in the case in which a digital camera 131 gives a return signal to the printing apparatus 111 in the low power consumption mode.

In the case of FIG. 5, the transmission of a return signal and the transmission of image data are performed in accordance with different communication standards (in other words, through different hardware interfaces).

The operation at this time proceeds as follows. First, the digital camera 131 sends a return signal. The return signal is received in the infrared remote control interface 23 of the printing apparatus 111, and given to the standby CPU 113. The standby CPU 113 receives the return signal, and then starts the main power source 3.

In other words, power is supplied to all the hardware interfaces. After that, all the hardware interfaces can receive data from external devices.

In the case of FIG. 5, the digital camera 131 sends image data through the IrDA interface having a transfer rate faster than that of the infrared remote control interface. The printing apparatus 111 uses the IrDA interface 21 to receive the image data, and starts printing a received image.

In addition, the process of setting the return interface in the embodiment may be performed in advance by the main CPU 115 during the normal operation. In this case, the standby CPU 113 may take over the processed result or a part of the processing operation of the main CPU 115.

Exemplary Setting 2

Figure 6:
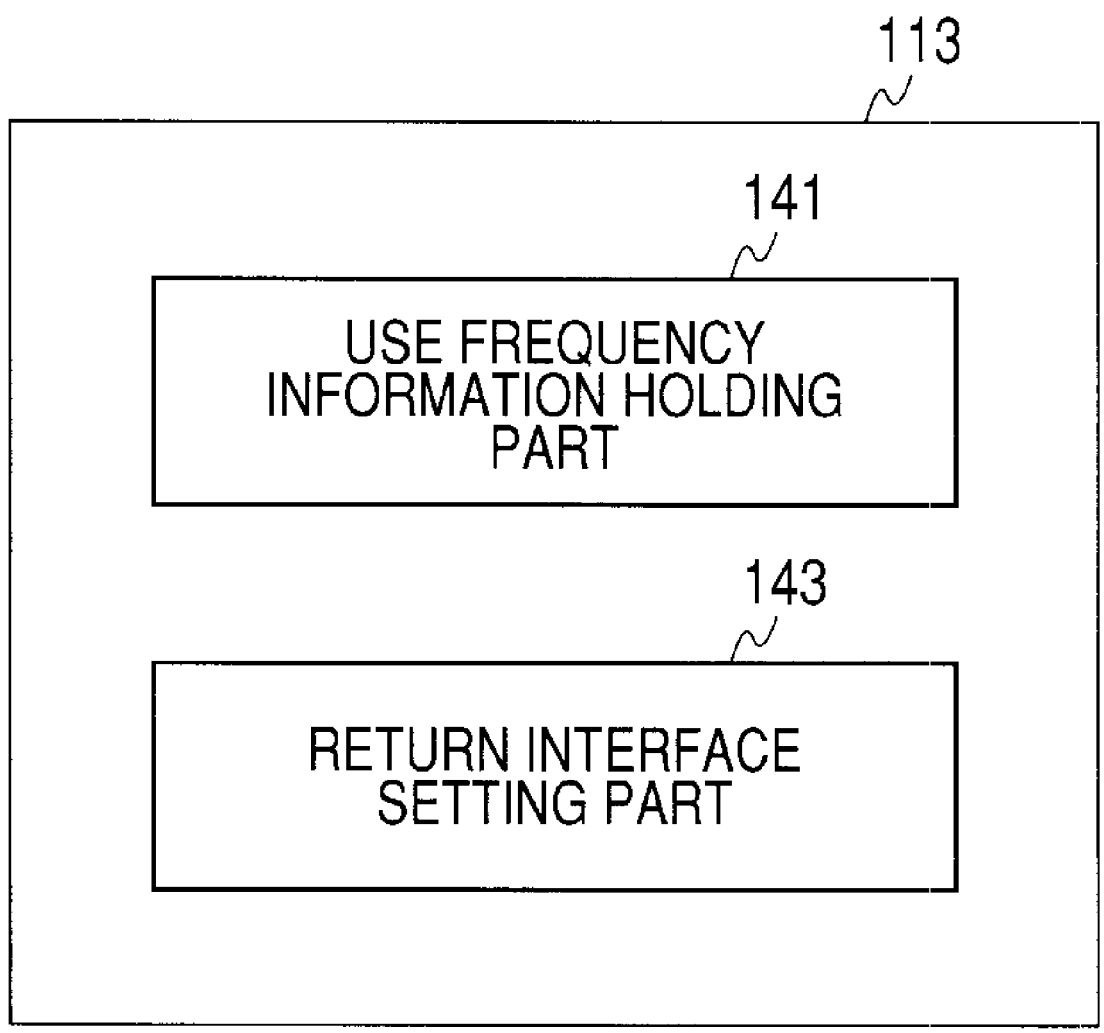
FIG. 6 shows a diagram depicting an exemplary functional block that implements the return interface setting processing function.

FIG. 6 shows a functional circuit configuration that implements the process of setting the return interface. FIG. 6 also depicts that the standby CPU 113 performs the process corresponding to the same function. In addition, the main CPU 115 may perform the process corresponding to the same function.

As shown in FIG. 6, the standby CPU 113 functions as a use frequency information holding part 141 and a return interface setting part 143.

The use frequency information holding part 141 is a storage device that stores information about frequencies of using the individual hardware interfaces. For example, the use frequency information holding part 141 stores the information in a part of the area of the RAM configuring the standby CPU 113 or in the storage area to which the standby CPU 113 can make access during the low power consumption mode. Moreover, for the information about frequencies of using hardware interfaces, various generating methods can be considered.

A Method of Counting the Number of Times Used During the Normal Operation

For example, there is a method in which the main CPU 115 is used to separately count the number of times of using the individual hardware interfaces during the normal operation and the counted result is stored as use frequency information. In addition, desirably, the use frequency information is the number of times used that is counted in a certain period from the point in time of measurement. This is because the possibility may be increased that the use frequency information is used in the transmission of the return signal as well.

However, since the main CPU 115 manages the use frequency information, in shifting the operation mode to the low power consumption mode, it is necessary to pass the use frequency information activated in response to power supply to the standby CPU 113 before the main power source 3 stops power supply. Alternatively, also in the low power consumption mode, it is necessary to adopt a scheme that the main CPU 115 writes the use frequency information to the storage area to which electric power is also supplied from the sub-power source 5.

In addition, in the case in which use frequency information is generated in this manner, the return interface setting part 143 performs the process of reading a hardware interface most frequently used out of the use frequency information holding part 141 and setting the hardware interface as a return interface. With these settings, even though there is a single hardware interface operating as a return interface, the possibility of receiving the return signal can be improved.

The Number of Times of Receiving the Return Signal

For example, there is a method in which the standby CPU 113 is used to count the number of times of receiving the return signal separately for the hardware interfaces and the counted results are stored as use frequency information. Also in this case, desirably, the use frequency information is the number of times used that is counted in a certain period. This is because the possibility may be increased that the use frequency information is used in the transmission of the return signal as well.

However, since the use frequency information is managed in the RAM area of the standby CPU 113, in shifting the operation mode to the normal operation mode, it is necessary to pass the use frequency information to the main CPU 115. Alternatively, desirably, the use frequency information is written to a non-volatile storage area, not shown. Alternatively, also in the low power consumption mode, a scheme is adopted that the main CPU 115 writes the use frequency information to the storage area to which electric power is also supplied from the sub-power source 5.

In addition, in the case in which use frequency information is generated in this manner, the return interface setting part 143 performs the process of reading a hardware interface most frequently used out of the use frequency information holding part 141 and setting the hardware interface as a return interface.

In the case of adopting this method, a hardware interface having the highest possibility of being used for the return process can be set as a return interface. Therefore, even though there is a single hardware interface operating as a return interface, the possibility of receiving the return signal can be improved.

A Method of Counting the Number of Printed Papers

For example, there is a method in which the main CPU 115 is used to separately count the number of printed papers or the number of times of access (a print instruction is one time regardless of the number of printed papers) done through the individual hardware interfaces during the normal operation and the counted results are stored as use frequency information. In addition, desirably, the use frequency information is the number of times used that is counted in a certain period from the point in time of measurement. This is because the possibility may be increased that the use frequency information is used in the transmission of the return signal as well.

Also in this case, since the main CPU 115 manages the use frequency information, in shifting the operation mode to the low power consumption mode, it is necessary to pass the use frequency information activated in response to power supply to the standby CPU 113 before the main power source 3 stops power supply. Alternatively, also in the low power consumption mode, it is necessary to adopt a scheme that the main CPU 115 writes the use frequency information to the storage area to which electric power is also supplied from the sub-power source 5.

In addition, in the case in which use frequency information is generated in this manner, the return interface setting part 143 performs the process of reading a hardware interface most frequently used out of the use frequency information holding part 141 and setting the hardware interface as a return interface. With these settings, even though there is a single hardware interface operating as a return interface, the possibility of receiving the return signal can be improved.

FIG. 7 shows the on and off states of the individual circuit blocks in the low power consumption mode. In the case of FIG. 7, electric power is supplied only to the wireless USB interface 19 among six hardware interfaces. This is because, in this example, the frequency of using the wireless USB interface 19 is the highest in a certain period in the past.

FIG. 8 shows an example in the case in which a digital camera 151 gives a return signal to the printing apparatus 111 in the low power consumption mode.

In the case of FIG. 8, the transmission of a return signal and the transmission of image data are performed in accordance with the same communication standards. Of course, these transmissions may be performed in accordance with separate communication standards.

The operation at this time proceeds as follows. First, the digital camera 151 sends a return signal. The return signal is received in the wireless USB interface 19 of the printing apparatus 111, and given to the standby CPU 113. The standby CPU 113 receives the return signal, and then starts the main power source 3.

In other words, power is supplied to all the hardware interfaces. After that, all the hardware interfaces can receive data from external devices. In the case of FIG. 8, the digital camera 151 continuously uses the wireless USB interface to send image data. The printing apparatus 111 uses the wireless USB interface 19 to receive the image data, and starts printing a received image.

Exemplary Setting 3

FIG. 9 shows the functional circuit configuration of the standby CPU 113 relating to the process of setting the return interface.

As shown in FIG. 9, the standby CPU 113 functions as a regional adoption information holding part 161 and a return interface setting part 163.

The regional adoption information holding part 161 is a storage device that stores information about frequencies of use (ownership) in the use region or the use country of using the printing apparatus 111. In the case in which the use region is the EU region at the present point in time, the Bluetooth interface is stored as information about frequencies of use. In addition, in the case in which the use region is the Far East Asia region at the present point in time, the IrDA interface is stored as information about frequencies of use.

For example, for the regional adoption information holding part 161, a part of the ROM area of the standby CPU 113 is used. Alternatively, information about frequencies of use is stored in a storage area to which the standby CPU 113 can make access during the low power consumption mode.

Moreover, in the regional adoption information holding part 161, only information about frequencies of use unique to the use region or the use country that is a shipping destination may be stored, or a plurality of items of information about frequencies of use may be stored in association with the use region or the use country. In the latter case, the optimum item of information is read based on a use region set in actual use, for example.

A user may separately input the settings of use regions. In addition, in the case in which a GPS receiver is mounted on the printing apparatus 111, or in the case in which the printing apparatus 111 can be directly or indirectly connected to a GPS receiver, a use region, for example, may be automatically set based on location information identified by receiving GPS signals.

Moreover, generally, it can be considered that information about frequencies of use unique to the use region or the use country is not changed so much, or it takes long time for change. However, nowadays, a time period necessary to propagate a particular technique is becoming shortened. Thus, desirably, the relation of associating the hardware interface with the use region or the use country that is a shipping destination can be modified later.

In order to cope with this event, it is demanded that the regional adoption information holding part 161 is a rewritable recording medium. In addition, the main CPU 115 rewrites information.

The return interface setting part 163 in this case sets the hardware interface stored in association with the use region to a return interface.

Moreover, the operation of turning on and off the hardware interface and the return operation (the operation of returning the operation mode from the low power consumption mode to the normal operation) in the low power consumption mode are the same as the other cases discussed above, omitting the descriptions.

In any cases, as in this example, the hardware interface most adopted in the use region is set to a return interface, whereby even though there is a single hardware interface that operates as a return interface, the possibility of receiving the return signal can be improved.

Exemplary Setting 4

FIG. 10 shows the functional circuit configuration of the main CPU 115 relating to the process of setting the return interface.

As shown in FIG. 10, the main CPU 115 functions as a user preference information holding part 171 and a return interface setting part 173.

The user preference information holding part 171 is a storage device that stores criterion information set by a user for setting a return interface. The user himself/herself who well knows the setting environment of the printing apparatus 111 can freely input the setting conditions, whereby even though there is a single hardware interface that functions as a return interface, the return signals can be sent and received with no troubles.

In addition, for example, criterion information may be information that selects anyone of the setting methods described above. Moreover, for example, criterion information may be information that specifies multiple conditions as criterion information.

In the user preference information holding part 171, for example, information is stored in a rewritable storage area to which the standby CPU 113 can make access during the low power consumption mode. Furthermore, for example, for the user preference information holding part 171, a rewritable storage area may be used that is accessible during the normal operation of the main CPU 115 and the other blocks. However, in this case, it is necessary to pass information to the standby CPU 113 in shifting the operation mode to the low power consumption mode.

The return interface setting part 173 in this case performs the process of setting a hardware interface having a higher matching degree with the criterion to a return interface among the hardware interfaces mounted on the printing apparatus 111.

Also in this case, the operation of turning on and off the hardware interface and the return operation (the operation of returning the operation mode from the low power consumption mode to the normal operation) in the low power consumption mode are the same as the cases discussed above, omitting the descriptions.

In any cases, since a single return interface is set in accordance with the user's determination criterion, the possibility of receiving the return signal can be improved as well as electric power consumption during the low power consumption mode is reduced.

Moreover, in the discussions above, the case is described in which the standby CPU 113 or the main CPU 115 sets the return interface in accordance with the criterion, but such a scheme may be adopted in which a user directly specifies a particular hardware interface. In this case, the user is demanded to have knowledge about hardware interfaces mounted on an electronic appliance.

However, it can be predicted which electronic appliances and hardware interfaces are highly likely to be used for returning power to the printing apparatus 111. Therefore, with the use of this scheme, the improvement of power saving and the possibility of receiving the return signal during the low power consumption mode can be compatible.

Exemplary Transmission of a Return Signal

Figure 11:
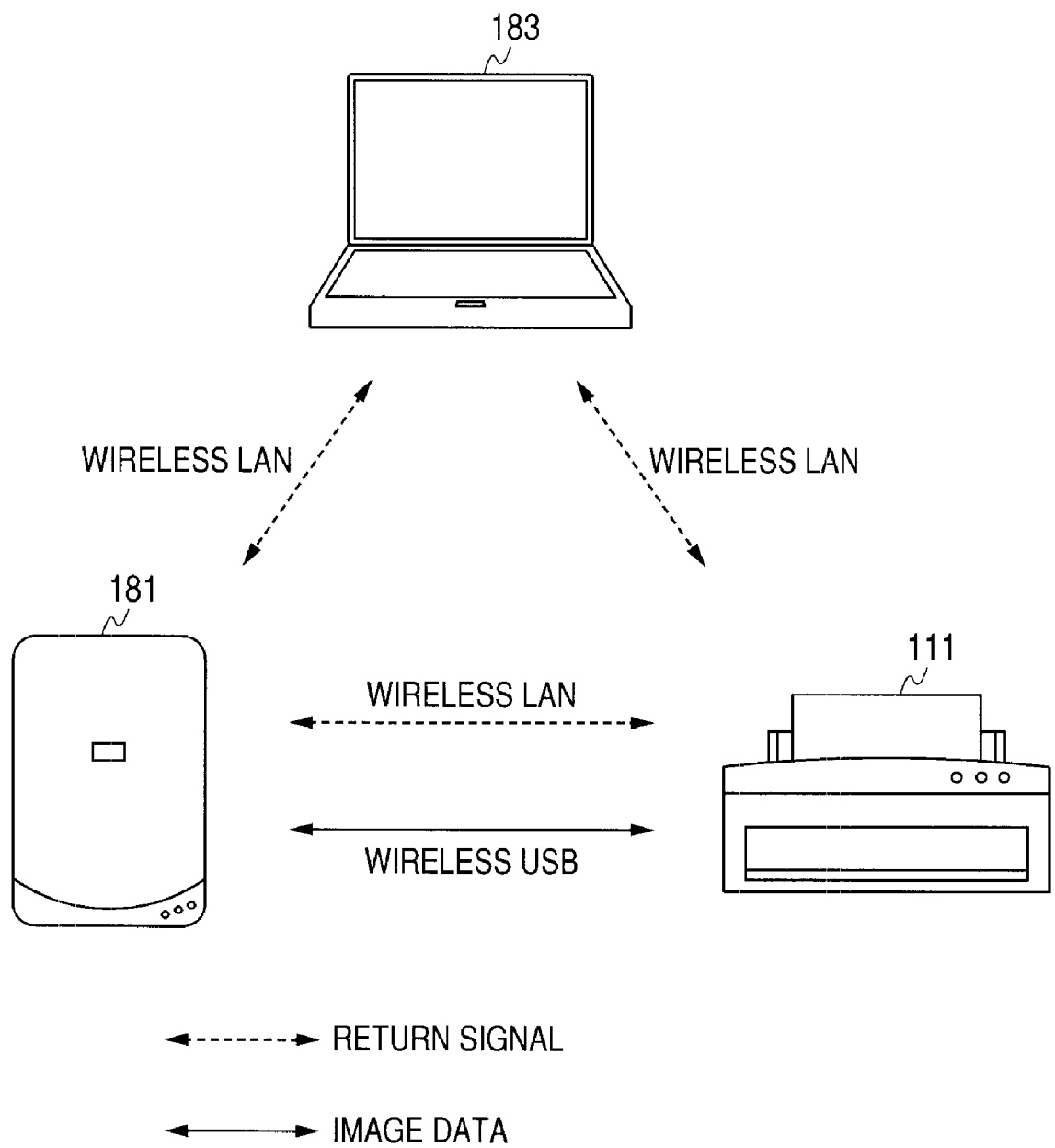
FIG. 11 shows a diagram depicting exemplary transmission paths of the return signal.
Figure 12:
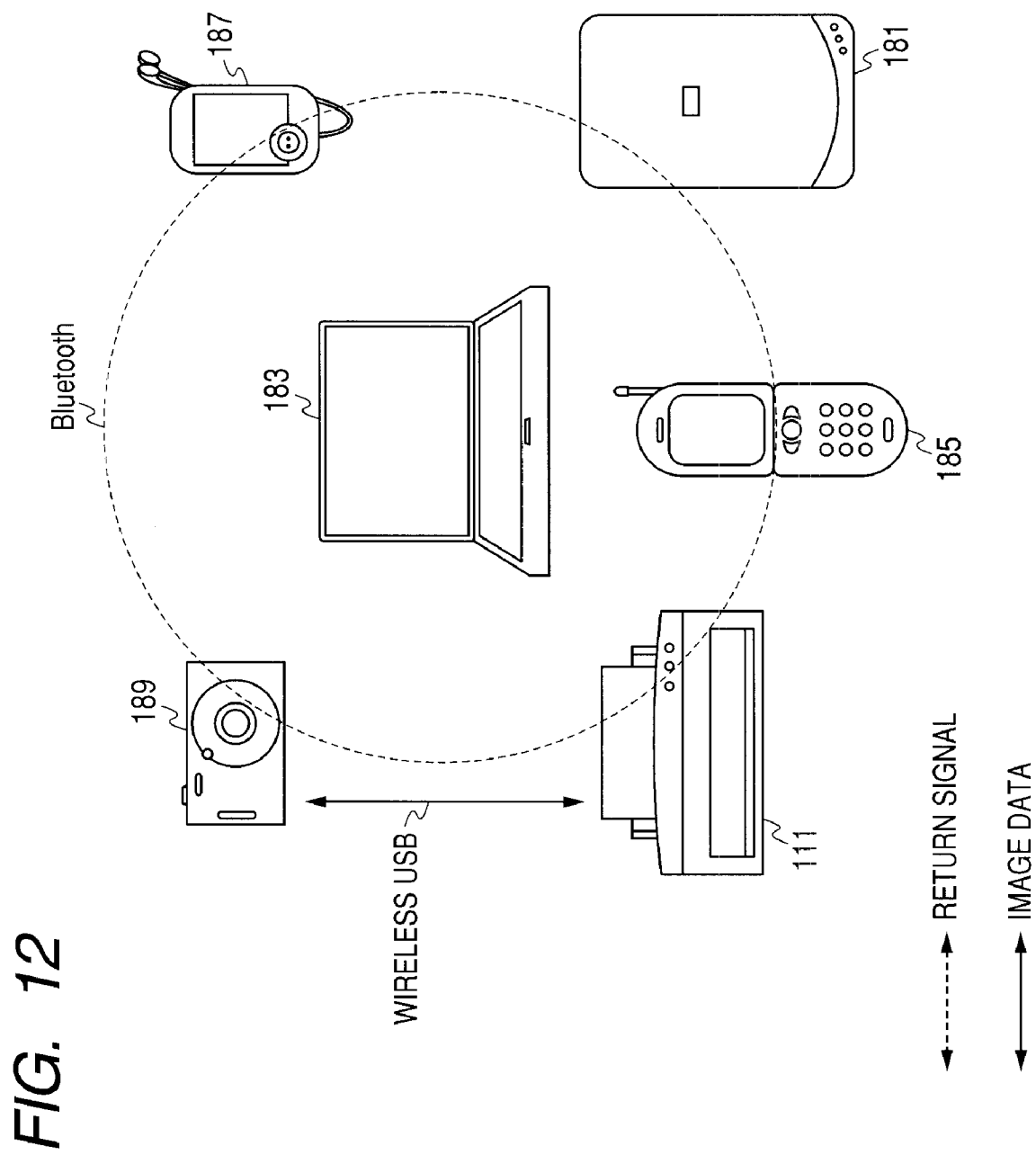
FIG. 12 shows a diagram depicting exemplary transmission paths of the return signal.

The Case in which Return Signals can be Sent by Using the Same Communication Standards as Those of the Return Interface FIGS. 11 and 12 show the transmission form of a return signal. In addition, FIGS. 11 and 12 correspond to the case in which a plurality of electronic appliances including the printing apparatus 111 forms a network based on the communication standards in common with each other.

FIG. 11 shows the case in which the printing apparatus 111, a scanner 181 and a computer 183 form a network via a wireless LAN. Moreover, suppose the printing apparatus 111 and the scanner 181 can directly communicate with each other through a wireless USB.

In this network, in the case in which a user sets the wireless LAN as a return interface, the return signal is directly sent via the wireless LAN or through the computer 183. In addition, the computer 183 receives a return signal from another electronic appliance, and then uses the wireless LAN to transfer the return signal. This processing function corresponds to a transfer processing part according to an embodiment of the invention.

Moreover, the printing apparatus 111 receives the return signal and returns to the normal operation, and then the scanner 181 sends image data through the wireless USB having the transfer rate faster than that of the wireless LAN. This processing function corresponds to a communication processing part according to an embodiment of the invention.

In the case in which the return signal and image data are sent from the starting point of the computer 183, the return signal and the image data are sent via the wireless LAN.

FIG. 12 shows the case in which a larger number of electronic appliances form a network.

The network shown in FIG. 12 depicts the case in which the printing apparatus 111, a scanner 181, a computer 183, a cellular telephone 185, a music player 187 and a digital camera 189 are connected via Bluetooth. In addition, the printing apparatus 111 is directly connected to the digital camera 189 through a wireless USB.

Also in the case of this network, a return signal is sent via Bluetooth set as a return interface by a user. In the case of FIG. 12, the return signal sent from the digital camera 189 is sent directly or indirectly to the printing apparatus 111.

Moreover, the printing apparatus 111 receives the return signal and returns to the normal operation, and then the digital camera 189 sends image data through the wireless USB having the transfer rate faster than that of Bluetooth. Thus, an image captured through the digital camera 189 is printed in the printing apparatus 111.

The Case in which it is Difficult to Send a Return Signal Using the Same Communication Standards as Those of the Return Interface In the discussions above, the case is described in which the source of the return signal uses the same communication standards as those of the return interface to communicate with the printing apparatus 111.

However, in actual use forms, the communication standards usable by the electronic appliance that is the source of the return signal are not always matched with the communication standards usable by the return interface.

In this case, such a scheme is necessary that can transfer a return signal through a third electronic appliance.

Figure 13:
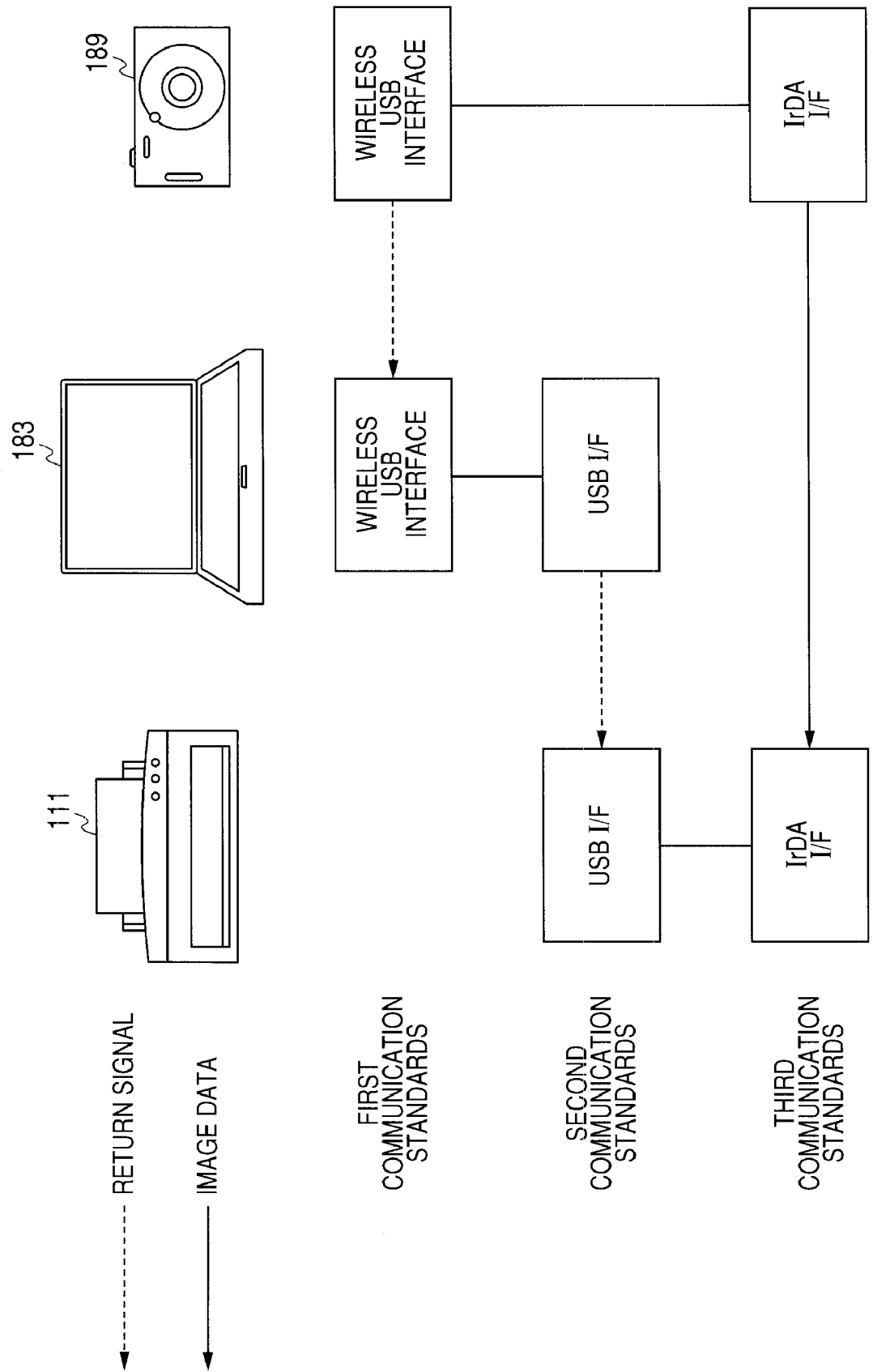
FIG. 13 shows a diagram depicting exemplary transmission paths of the return signal.

This type of transmission form will be described with reference to FIG. 13. In addition, suppose the printing apparatus 111 has a USB interface and an IrDA interface. Suppose a computer 183 has a USB interface and a wireless USB interface. Suppose a digital camera 189 has a wireless USB interface and an IrDA interface.

Moreover, suppose the printing apparatus 111 sets the USB interface to a return interface. In other words, in order to reduce power consumption, the power source of the IrDA interface is turned off.

In this case, it is difficult that the digital camera 189 directly gives a return signal to the printing apparatus 111.

In this case, the digital camera 189 uses the wireless USB interface to send the return signal to the computer 183.

The computer 183 receives the return signal, uses the USB interface that can be used by itself, and transfers the return signal to the printing apparatus 111. This processing function corresponds to a transfer processing part according to an embodiment of the invention.

The printing apparatus 111 receives the return signal in the USB interface that is the return interface. After that, the standby CPU 113 starts the main power source 3, and returns the operation mode of the printing apparatus 111 to the normal operation mode.

Consequently, the digital camera 189 can communicate with the printing apparatus 111 using the IrDA interface. After that, the digital camera 189 uses its own IrDA interface, and directly sends image data to the printing apparatus 111. This processing function corresponds to a communication processing part according to an embodiment of the invention. Then, the printing apparatus 111 starts printing an image.

In other words, even though the digital camera 189 that is the source of the return signal and the printing apparatus 111 do not have the interface in common with each other, the printing apparatus 111 can be returned from the low power consumption mode through the computer 183 having the interface in common with the digital camera 189 and the printing apparatus 111.

Other Embodiments

Other Hardware Interfaces

In the embodiment discussed above, the Ethernet (registered trademark) interface, the USB interface, the wireless USB interface, the IrDA interface, the infrared remote control interface, the Bluetooth interface and the wireless LAN interface are exemplified. However, hardware interfaces other than these may be used. For example, IEEE 1394 interfaces may be used.

Other Electronic Appliances Having the Low Power Consumption Mode

In the embodiment discussed above, the case is described in which the printing apparatus 111 is returned from the low power consumption mode. In the embodiment discussed above, the appearance of the printing apparatus 111 is a multi-purpose apparatus used in offices and homes, but the embodiment can be adapted to kiosk apparatuses provided in shops, for example.

Of course, the electronic appliance having the low power consumption mode is not restricted to the printing apparatus 111. For example, the embodiment can be widely adapted to television sets, monitor apparatuses, video cameras, AV storage apparatuses, game machines, cellular telephones, air conditioners, and other electronic appliances.

Figure 14:
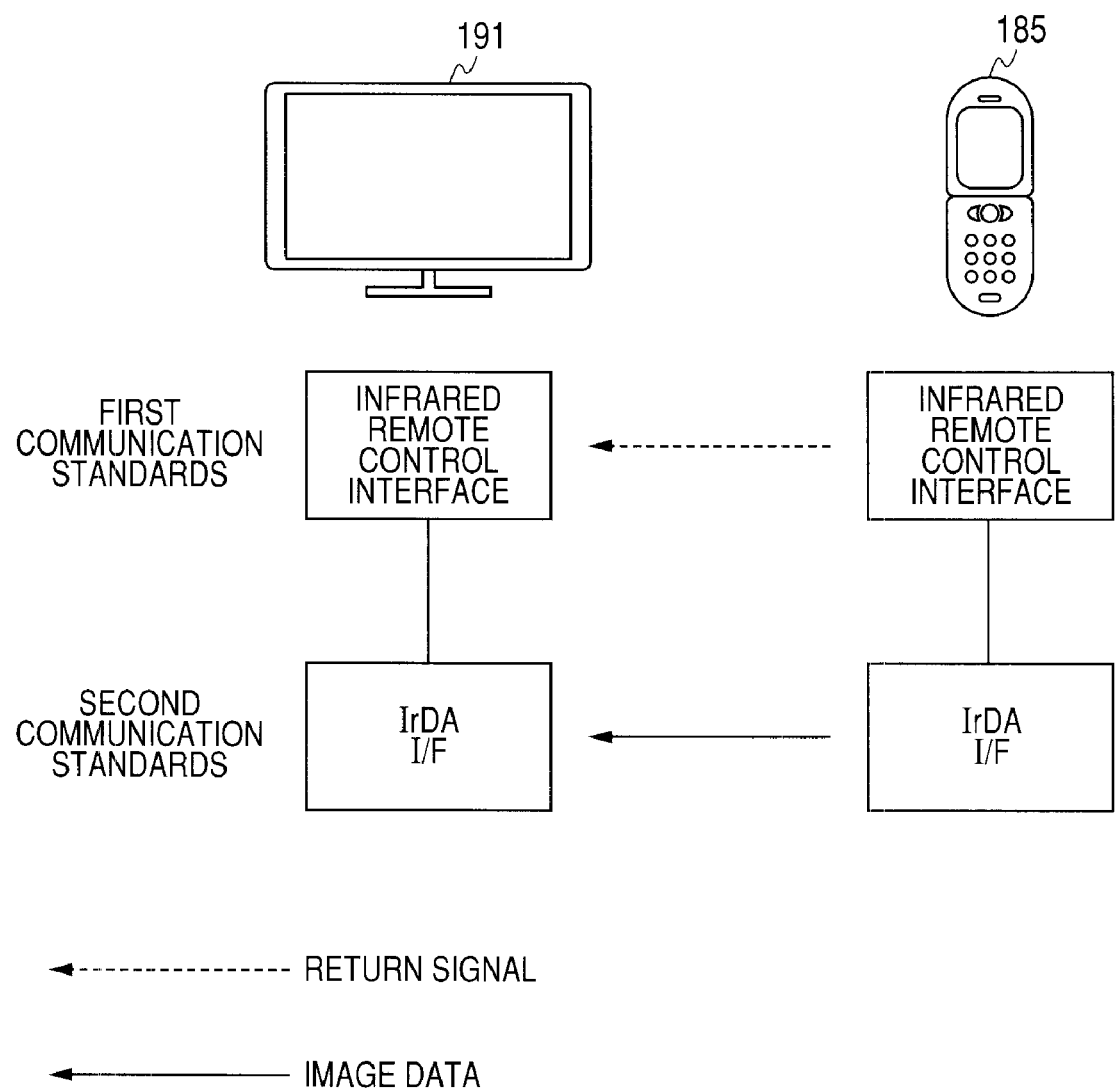
FIG. 14 shows a diagram depicting another exemplary system.

FIG. 14 shows an example in which a cellular telephone 185 sends a return signal to a television set 191 in the low power consumption mode. FIG. 14 shows an example in the case in which an infrared remote control interface specified as a return interface is used to send the return signal. In FIG. 14, after power is returned to the television set 191, the cellular telephone 185 sends image data, and then an image is displayed on a screen.

In addition, in the case of FIG. 14, an IrDA interface is used to send image data, the IrDA interface having the transfer rate faster than that of the infrared remote control interface.

The Number of the Return Interfaces Set

In the embodiment discussed above, the case is described in which only a single hardware interface is set as a return interface among a plurality of hardware interfaces.

However, when the hardware interfaces are included in the entire hardware interfaces, two or more of hardware interfaces may be set as a return interface so long as they are a part of the entire hardware. Of course, in the viewpoint of power consumption, the smaller the number of return interfaces is, the more excellent.

Other Methods of Setting the Return Interface

In the embodiment discussed above, the case is described in which a hardware interface having the highest priority is set as a return interface as the frequencies of use and the use region are the setting conditions.

However, in the case in which there is no hardware interface positioned at the highest on the setting conditions, desirably, the hardware interface positioned at the highest on the setting conditions is set as a return interface in priority among own hardware interfaces.

A Device that Performs the Setting Process

In the embodiment discussed above, the case is described in which the return interface is set through the software process performed by the CPU. However, the same function may be implemented in a logic circuit manner (as a signal process performed by a hardware device).

Others

In the embodiment discussed above, various modifications can be considered within the scope of the teachings of the embodiment of the invention. In addition, various modifications and applications can be considered that are created or combined based on the descriptions of the specification.

It should be understood by those skilled in the art that various modifications, combinations, sub-combinations and alterations may occur depending on design requirements and other factors insofar as they are within the scope of the appended claims or the equivalents thereof.

What is claimed is:

1. An electronic device comprising:
a plurality of hardware interfaces mounted on the electronic device and configured for communication with at least one external device;
a return interface setting part configured to set at least one of the plurality of hardware interfaces as a return interface based on a number of times each hardware interface receives a return signal to cause the electronic device to return from a low power consumption mode to a normal operation mode,
wherein,
the return interface setting part is configured to set at least a hardware interface that is most frequently used for returning the electronic device from the low power consumption mode to the normal operation mode as the return interface.

2. The electronic device according to claim 1, wherein the return interface setting part is further configured to use information about a use region in which individual hardware interfaces are used as a return interface setting criterion.

3. An electronic device comprising:
a plurality of hardware interfaces mounted on the electronic device and configured for communication with at least one external device;
a return interface setting part configured to set at least one of the plurality of the hardware interfaces as a return interface based on a number of times each hardware interface receives a return signal to cause the electronic device to return from a low power consumption mode to a normal operation mode; and
a transfer processing part configured to use the hardware interface set as the return interface to receive the return signal from the external device and to transfer the return signal to a return signal processing part in the electronic device,
wherein,
the return interface setting part is configured to set at least a hardware interface that is most frequently used for returning the electronic device from the low power consumption mode to the normal operation mode as the return interface.

4. An electronic device comprising:
a plurality of hardware interfaces mounted on the electronic device and configured for communication with at least one external device;
a return interface setting part configured to set at least one of the plurality of the hardware interfaces as a return interface based on a number of times each hardware interface receives a return signal to cause the electronic device to return from a low power consumption mode to a normal operation mode; and
a communication processing part configured to indirectly supply power to the electronic device when the electronic device is operating in the low power consumption mode and to initiate direct communications with the external device after receipt of the return signal from the external device,
wherein,
the return interface setting part is configured to set at least a hardware interface that is most frequently used for returning the electronic device from the low power consumption mode to the normal operation mode as the return interface.

5. A method of setting a return interface, the method performed in an electronic device designed for low power consumption mode, the electronic device having a plurality of hardware interfaces mounted thereon for communication with at least one external device, the method comprising the steps of:

setting at least one of the plurality of hardware interfaces as a return interface based on a number of times each hardware interface receives a return signal to cause the electronic device to return from the low power consumption mode to a normal operation mode; and stopping power to the hardware interfaces not set as the return interface when the electronic device is operating in the low power consumption mode, wherein, at least a hardware interface that is most frequently used for returning the electronic device from the low power consumption mode to the normal operation mode is set as the return interface.

6. A return communication method comprising the step of:

setting at least one of a plurality of hardware interfaces mounted on an electronic device as a return interface based on a number of times each hardware interface receives a return signal to cause the electronic device to return from a low power consumption mode to a normal operation mode; and using the set hardware interface in accordance with communication standards in common with an external device generating the return signal and the electronic device having the hardware interface; and transferring the return signal to a return signal processing part in the electronic device when the electronic device receives the return signal via the return interface, wherein, at least a hardware interface that is most frequently used for returning the electronic device from the low power consumption mode to the normal operation mode is set as the return interface.

7. A return communication method comprising the steps of:

setting at least one of a plurality of hardware interfaces on a first electronic device as a return interface based on a number of times each hardware interface receives a return signal to cause the first electronic device to return from a low power consumption mode to a normal operation mode;

indirectly returning the first electronic device from the low power consumption mode to the normal operation mode through a second electronic device that sends the return signal to the first electronic device by the return interface; and communicatively coupling the first electronic device with the second electronic device after the first electronic device begins operating in the normal operation mode, wherein, at least a hardware interface that is most frequently used for returning the first electronic device from the low power consumption mode to the normal operation mode is set as the return interface.

8. The electronic device according to claim 3, wherein the return interface setting part is further configured to use information about a use region in which individual hardware interfaces are used as a return interface setting criterion.

9. The electronic device according to claim 4, wherein the return interface setting part is further configured to use information about a use region in which individual hardware interfaces are used as a return interface setting criterion.

10. The electronic device according to claim 1, wherein the number of times each hardware interface receives the return signal is counted in a given period.

11. The electronic device of claim 3, wherein the number of times each hardware interface receives the return signal is counted in a given period.

12. The electronic device of claim 4, wherein the number of times each hardware interface receives the return signal is counted in a given period.

13. The method according to claim 5, further comprising:

using information about a use region in which individual hardware interfaces are used as a return interface setting criterion.

14. The method of claim 5, wherein the number of times each hardware interface receives the return signal is counted in a given period.

15. The method of claim 6, wherein the number of times each hardware interface receives the return signal is counted in a given period.

16. The method of claim 7, wherein the number of times each hardware interface receives the return signal is counted in a given period.

17. A non-transitory memory storing a program that, when executed by a processing unit in an electronic device having a plurality of hardware interfaces mounted thereon, the plurality of hardware interfaces configured for communication with at least one external device, causes the processing unit to perform the functions of:

setting at least one of the plurality of hardware interfaces as a return interface based on a number of times each hardware interface receives a return signal to cause the electronic device to return from a low power consumption mode to a normal operation mode; and stopping power to the hardware interfaces not set as the return interface when the electronic device is operating in the low power consumption mode, wherein, at least a hardware interface that is most frequently used for returning the electronic device from the low power consumption mode to the normal operation mode is set as the return interface.

18. The memory according to claim 17, wherein the number of times each hardware interface receives the return signal is counted in a given period.

19. The memory of claim 17, wherein the program, when executed by the processing unit, causes the processing unit to further perform the function of:

using information about a use region in which individual hardware interfaces are used as a return interface setting criterion.

* * * * *